(12) United States Patent
Marcovici et al.

(10) Patent No.: US 8,629,408 B2
(45) Date of Patent: Jan. 14, 2014

(54) OVERLAPPING DETECTOR ELEMENTS OF A DETECTOR ARRAY FOR A RADIATION SYSTEM

(75) Inventors: Sorin Marcovici, Lexington, MA (US); Olivier Tousignant, Saint-Lazare (CA)

(73) Assignee: Analogic Corporation, Peabody, MA (US)

( * ) Notice: Subject to any disclaimer, the term of this patent is extended or adjusted under 35 U.S.C. 154(b) by 305 days.

(21) Appl. No.: 13/015,674

(22) Filed: Jan. 28, 2011

(65) Prior Publication Data

US 2012/0193548 A1     Aug. 2, 2012

(51) Int. Cl.
    *G01T 1/00*         (2006.01)

(52) U.S. Cl.
    USPC .................................................. 250/393

(58) Field of Classification Search
    USPC ................... 250/393; 378/19, 98.8
    See application file for complete search history.

(56) References Cited

U.S. PATENT DOCUMENTS

| | | | |
|---|---|---|---|
| 7,750,310 B2 * | 7/2010 | Seino et al. | 250/370.13 |
| 2002/0070365 A1 * | 6/2002 | Karellas | 250/581 |
| 2004/0042585 A1 * | 3/2004 | Nagarkar et al. | 378/98.8 |
| 2012/0153163 A1 * | 6/2012 | Levene et al. | 250/361 R |

\* cited by examiner

*Primary Examiner* — David Porta
*Assistant Examiner* — Hugh H Maupin
(74) *Attorney, Agent, or Firm* — Cooper Legal Group LLC (57) ABSTRACT

One or more techniques and/or systems described herein provide for creating detector elements that are configured to be overlaid, such that at least a portion of gap between two detector elements is situated in a plane that is not parallel to a plane through which primary radiation travels. That is, a first detector element comprises a portion that is configured to overlap a portion of a second detector element. The detector element(s) may be direct conversion or indirect conversion detector elements. Moreover, one or more electrodes may be placed within the gap and/or along an edge of the detector element to assist in the movement of charge generated by a charge producing portion of the detector element.

20 Claims, 4 Drawing Sheets

OVERLAPPING DETECTOR ELEMENTS OF A DETECTOR ARRAY FOR A RADIATION SYSTEM

BACKGROUND

The present application relates to detector elements of a radiographic detector array. It finds particular application with flat panel, direct conversion detector arrays, but may also relate to other types of detector arrays where two or more detector elements are arranged to form a detector array. Such detector arrays are commonly used in medical, security, and/or industrial radiographic imaging systems, for example.

Radiographic imaging systems, such as projection radiography systems, computed tomography (CT) systems, line scanners, etc., provide information, or images, of the inside of an object under examination (e.g., interior aspects of an object under examination). That is, an object under examination by the radiographic imaging system is exposed to radiation, and one or more images are formed based upon the radiation absorbed by the object, or rather an amount of radiation that is able to pass through the object. Typically, highly dense objects absorb (e.g., attenuate) more radiation than less dense objects, and thus an object having a higher density, such as a bone or metal object, for example, will appear differently than less dense objects, such as fatty tissue or clothing, for example.

Traditionally x-rays images were formed using x-ray film. The film was exposed to radiation, or light yielded from the radiation (e.g., if intensifying screens were placed between the film and the radiation source), and a visible pattern of metallic black silver was produced on the film. The degree of blackening (e.g., the amount of metallic black silver produced) depended upon the intensity of the radiation (e.g., the magnitude of radiation absorbed by the object). Thus, the detector array was essentially comprised of an x-ray film and possibly one or more intensifying screens.

More recently, the x-ray film and the intensifying screens have been replaced with digital detector arrays, such as flat panel detector arrays, that are configured to convert radiation, either directly or indirectly, into electrical current that is measured to yield electrical signals. The amount of electric current measured is proportional to the number of photons that impact the digital detector array, and can be used to create an image(s) of the object under examination.

It will be appreciated to those skilled in the art that there are two basic types of digital detector arrays, direct conversion detector arrays and indirect conversion detector arrays. Direct conversion detector arrays are typically configured to convert detected radiation directly into electric charge using a crystalline or amorphous material, for example. Indirect conversion detector arrays are generally configured to convert detected radiation into another medium, typically light, before the electric charge is produced. Thus, for example, indirect conversion detector arrays may convert radiation into light using a scintillator material (e.g., Cadmium Tungstate, Bismuth Germanate, Cesium Iodide, Sodium Iodide, Lutetium Orthosilicate, an amorphous material, etc.) and may subsequently convert the light into electric charge using a photodetector array (e.g., a plurality of photodiodes). Generally, in both direct and indirect conversion detector arrays, the electric charge is detected/measured using a thin-film transistor (TFT) array comprising a two-dimensional (2D) capacitor array, but it may be detected/measured by other means known to those skilled in the art.

Regardless of the type of digital detector array, in some radiographic image applications it is preferable to manufacture the detector array using a plurality of detector elements (e.g., which are essentially identical in shape and size). In this way, if a portion of the detector array malfunctions, the malfunctioning portion of the detector array can be replaced without having to replace the entire detector array. Moreover the size of a detector array, if manufactured as one unit, may be limited due to manufacturing constraints. However, by fitting together a plurality of detector elements to form the completed detector array, the theoretical size of a detector array is virtually limitless. Thus, for a plurality of reasons, digital detector arrays are, at times, manufactured using a plurality of detector elements that are physically coupled together to form the completed detector array.

While manufacturing digital detector arrays from a plurality of detector elements has proven useful, there are several disadvantages to such a technique. For example, between respective detector elements there is a gap, which can allow radiation to pass through the detector array unimpeded and to interfere with electronics situated below the detector array. While this gap can be filled using a filler material, such as lead or loaded oxides, for example, that mitigates the amount of radiation that is capable of being passed through to the electronics, the detector pitch generally needs to be increased to accommodate the filler material. It can be appreciated, however, that a larger gap is undesirable because it puts a limit on how small the pixel pitch can be made.

SUMMARY

Aspects of the present application address the above matters, and others. According to one aspect a radiographic detector array is provided. The radiographic detector array comprises a first detector element comprising at least one edge that is angled at other than 90 degrees relative to a bottom surface of the first detector element to receive an edge of an adjacent, second detector element.

According to another aspect, a method is provided. The method comprises creating a first detector element for a radiographic detector array comprising a portion that is configured to be overlaid by a portion of a second detector element.

According to yet another aspect, a radiographic examination apparatus is provided. The radiographic examination apparatus comprises a radiation source configured to emit radiation. The radiographic examination apparatus also comprises a two-dimensional (2D) detector array comprising a plurality of detector elements, wherein a first detector element is configured to at least partially overlap a second detector element. At least a portion of a gap defined between the first and second detector elements resides in a plane that is not parallel to a plane through which primary radiation traverses.

Those of ordinary skill in the art will appreciate still other aspects of the present application upon reading and understanding the appended description.

FIGURES

The application is illustrated by way of example and not limitation in the figures of the accompanying drawings, in which like references indicate similar elements and in which.

DESCRIPTION

The claimed subject matter is now described with reference to the drawings, wherein like reference numerals are generally used to refer to like elements throughout. In the following description, for purposes of explanation, numerous specific details are set forth in order to provide a thorough understanding of the claimed subject matter. It may be evident, however, that the claimed subject matter may be practiced without these specific details. In other instances, structures and devices are illustrated in block diagram form in order to facilitate describing the claimed subject matter.

One or more detector elements and/or techniques for manufacturing detector elements for a radiographic detector array that may be part of a radiographic examination apparatus are provided. The detector elements are configured to overlap such that, when a detector array is constructed from the detector elements, a portion of a first detector element resides above or overlaps a portion of a second detector element (e.g., such that a portion of the second detector element is covered by the overlapping portion of the first detector element from the perspective of the radiation source), a portion of the second detector element resides above or overlaps a portion of a third detector element and so forth. Moreover, at least a portion of a gap defined by adjacent edges of the first detector element and the second detector element (e.g., assuming there is a gap at all) is situated in a plane that is not parallel to a plane through which primary radiation traverses or travels. It will be appreciated that "primary radiation" as used herein refers to radiation that follows a substantially straight path from the radiation source to the detector array. Conversely, "secondary radiation," "scattered radiation," and the like are used herein to refer to radiation that does not follow a straight path from the radiation source to the detector array. Generally, radiation becomes secondary or scattered radiation by mechanism(s) or phenomena related to the interaction of radiation with an aspect of the object under examination and/or the radiation examination apparatus itself.

Figure 1:
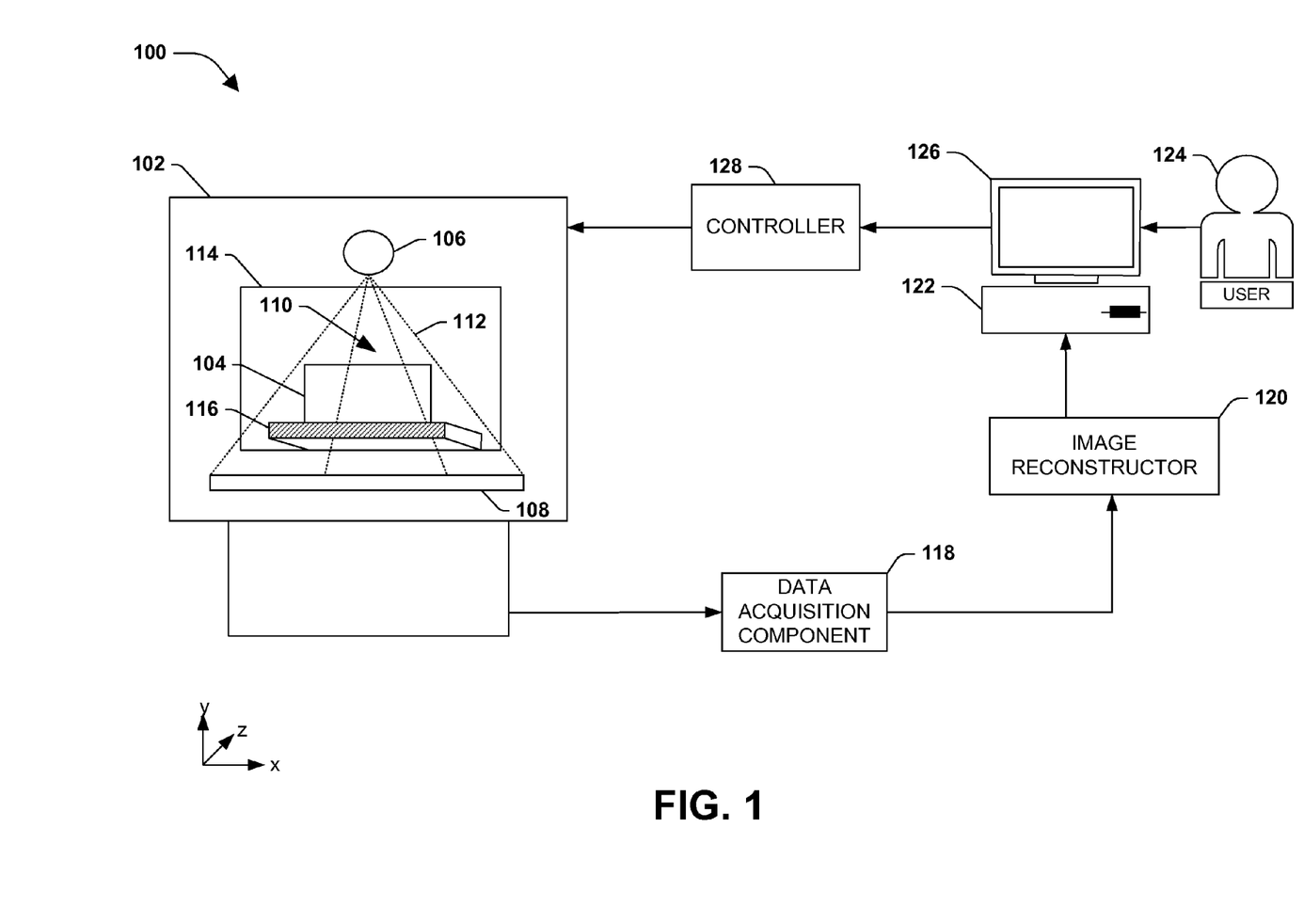
FIG. 1 is a schematic block diagram illustrating a radiographic examination apparatus.

FIG. 1 is an illustration of an example environment 100 of a radiographic examination apparatus in which data that is generated from components in a radiographic system 102 (e.g., which comprises a flat panel, digital detector array or other digital detector array) may be acquired so that one or more images of an object 104 under examination may be produced and displayed on a monitor 126, for example, such as for viewing by a human user 124 (e.g., radiologist, security personnel, etc.). Such a system 102 may be used to diagnose medical conditions (e.g., broken bones) in a human patient at a medical center or in an animal at a veterinary clinic, and/or to identify objects of interest (e.g., potential threat objects, banned objects, etc.) associated with (e.g., comprising, comprised within, etc.) an object 104 (e.g., luggage) under examination at a security checkpoint, for example. In another embodiment, no image is generated, but a density (or some other object physico-chemical property) of respective objects (or aspects or parts thereof) can be identified and compared with a list of densities, z-effectives, etc. associated with predetermined items (e.g., banned items) to determine if the object 104 potentially comprises one or more of the predetermined items.

It will be appreciated that the example radiographic system 102 described herein is configured similar to a line scanner, such as commonly found at airport security checkpoints. However, the instant application is not intended to be so limited. That is, to the extent possible, the instant application, including the scope of the claimed subject matter, is intended to be applicable to other systems as well. For example, in another embodiment, the radiographic system may be a mammography system. Moreover, it will also be appreciated that the example environment 100 merely illustrates an example schematic and is not intended to be interpreted in a limiting manner, such as necessarily specifying the orientation of the components described herein. For example, a data acquisition component 118 as illustrated in FIG. 1 may be part of the radiographic system 102, or rather may be part of a detector array 108 of the radiographic system 102.

In the example environment 100, the radiographic system 102 can be configured to examine one or more objects 104 (e.g., a human patient, a series of suitcases at an airport, etc.) that are conveyed or placed into an examination region 110 through a window 114 in the radiographic system 102 via a support article 116, such as a bed or conveyor belt, for example. The radiographic system 102 can comprise a radiation source 106 (e.g., an ionizing or non-ionizing radiation source) and a detector array 108 (e.g., comprised of a plurality of detector elements) that can be mounted on a substantially diametrically opposite side of the radiographic system 102 relative to the radiation source 106. During an examination of the object(s) 104, the radiation source 106 emits fan, cone, wedge, and/or other shaped radiation 112 towards the object (s) 104 under examination. Generally, when using a flat panel detector array, the radiation 112 is emitted substantially continuously during the examination. However, in some radiographic systems, the radiation 112 may be pulsed or otherwise intermittently applied during the examination.

As the radiation 112 traverses the object(s) 104, the radiation 112 may be attenuated differently by different parts of the object(s) 104. Because different parts attenuate differently the radiation 112, an image may be produced based upon the attenuation, or rather indirectly from it based on the variations in the number of radiation photons that are detected by the detector array 108. For example, more dense aspects of the object(s) 104, such as a bone or metal plate, for example, may attenuate more of the radiation 112 (e.g., causing fewer radiation photons to strike the detector array 108) than less dense materials, such as skin or clothing.

As will be discussed in more detail with respect to FIGS. 4-6, the detector array 108 is generally comprised of one or more detector elements that may be fit together to form the detector array 108. The detector elements, and thus the detector array itself, may be direct conversion detector elements or indirect conversion detector elements. It will be appreciated that as used herein direct conversion detector elements and indirect conversion detector elements differ in, among other things, how the radiation is converted into electric charge. Generally, direct conversion detector elements are configured to convert the impinging radiation directly into electric charge using a direct conversion material such as a crystalline material (e.g., Cadium Zinc Telluride, Cadmium Telluride, Silicon etc.) and/or an amorphous material, such as amorphous Selenium, for example. Conversely, indirect conversion detector elements are configured to convert the impinging radiation into another medium, such as light, for example, using a scintillator material, for example, and the electric charge is generated based upon detection of the other medium (e.g., based upon the amount of light that is detected) using a photodetector array (e.g., a plurality of photodiodes), for example.

Figure 2:
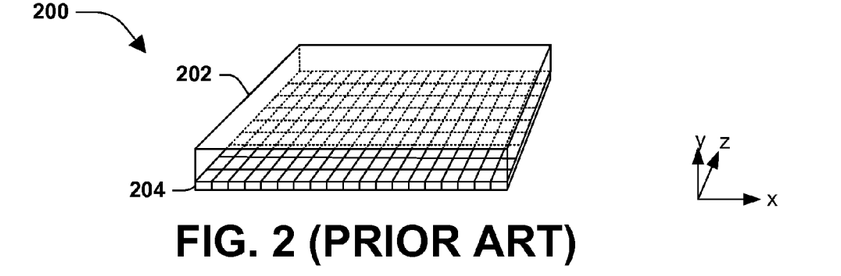
FIG. 2 illustrates a three-dimensional view of a prior art detector element that may be comprised within a radiographic detector array.
Figure 3:
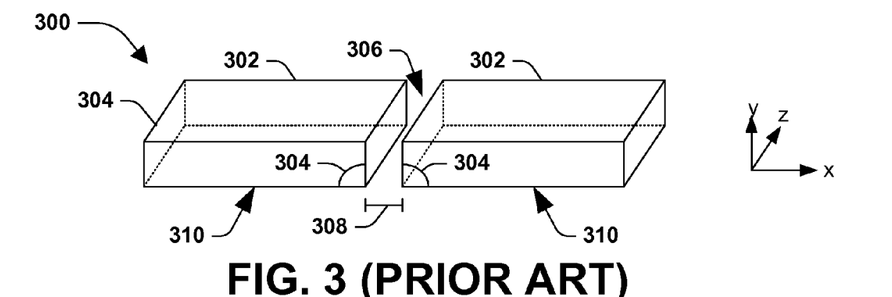
FIG. 3 illustrates a three-dimensional view of two, prior art detector elements that may be comprised within a radiographic detector array, the detector elements separated by a gap.

As described herein, one or more of the detector elements are configured to at least partially overlap an adjoining detector element, such that a portion of a first detector element is at least partially on top of a portion of a second detector element (e.g., such that a portion of the second detector element is covered by the overlapping portion of the first detector element from the perspective of the radiation source). In this way, as described in more detail with respect to FIGS. 4-6, a gap between the first and second detector elements maybe reduced (e.g., theoretically to substantially zero if manufacturing tolerances were zero, but in practice down to as little at 10 microns or less depending upon the quality of the manufacturing) relative to the size of a gap commonly found in presently used detector elements (e.g., as illustrated in FIGS. 2-3). Moreover, because the first and second detector elements at least partially overlap, at least a portion of the gap may be situated in a plane that is not parallel to a plane through which primary radiation traverses. Thus, the amount of radiation that is able to pass through the gap and possibly interfere with electronics below the detector array 108 is mitigated. Moreover, if the radiographic system 102 further comprises one or more anti-scatter devices (e.g., such as an anti-scatter grid or anti-scatter collimator), the amount of radiation that passes through the gap and interferes with electronics below the detector array 108 may be reduced to substantially zero.

It will be appreciated that while reference is at times made herein to two overlapping detector elements, that detector arrays may be comprised of many more than two detector elements where some or all of these elements may overlap with adjacent elements as provided herein. For example, a uni-dimensional, linear detector array (e.g., comprised of merely one row of detector elements) may comprise 2 or more elements, where adjacent elements overlap one another as provided herein. A two-dimensional (2D), planar detector array (e.g., comprised of a plurality of rows of detector elements) may, for example, comprise 4 or more elements, where adjacent elements overlap one another as provided herein.

Radiation 112 that impinges the detector array 108 generally creates an electric charge that may be detected by one or more pixels of the detector array 108 that are in well-defined spatial proximity to the location where the radiation impinged. Respective pixels generate a signal (e.g., generally in an analog domain) proportional to the electric charge detected (e.g., which was generated based upon the impinging radiation), and such signals are fed to a data acquisition component 118 (e.g., which may be integral with the system 102, or with the detector array 108). Because the electric charge detected by the one or more pixels is directly related to the number of radiation photons, the output is indicative of the attenuation of the radiation 112 as it traversed the object(s) 104. It will be appreciated that, in one embodiment, when a pixel is not collecting electric charge, the pixel may produce a baseline signal that indicates that the pixel has detected no electric charge. In yet another embodiment, no signal may be generated by a pixel unless and/or until an electric charge is detected.

The data acquisition component 118 is configured to collect information and data related to radiation that was detected by the detector array 108. For example, in one embodiment, the data acquisition component 118 is configured to receive analog signals generated by the detector array 108, which are indicative of the detected radiation, and to convert the analog signals into the digital domain using analog-to-digital techniques known to those skilled in the art. Moreover, the data acquisition component 118 may be configured to compile the digital data (e.g., yielded from a plurality of pixels of the detector array 108) into one or more projection images.

The example environment 100 also comprises an image reconstructor 120 configured to receive the one or more projection images from the data acquisition component 118 and generate one or more radiographic images that are more understandable by a user 124 viewing the radiographic image(s) relative to the projection images. Stated differently, the image reconstructor 120 is configured to convert the images from projection space to image space using suitable analytical, iterative, and/or other image reconstruction techniques known to those skilled in the art (e.g., 2D filtered backprojection).

Images that are reconstructed by the image reconstructor are transmitted to a workstation 122 (e.g., a computer) configured to receive image(s) and can be displayed on a monitor 126 to the user 124 (e.g., medical personnel, security personnel, etc.). A user 124 can thus inspect the image(s) to identify areas of interest within the object(s) 104. The workstation 122 can also be configured to receive user input which can direct operations of the radiographic system 102 (e.g., radiation dose, etc.), for example.

In the example environment 100, a controller 128 is operably coupled to the workstation 122. In one example, the controller 128 is configured to receive user input from the workstation 122 and generate instructions for the radiographic system 102 indicative of operations to be performed. For example, the user 124 may want to rescan the object(s) 104 using a different dose or energy of radiation and the controller 128 may issue an instruction instructing the radiation source 106 to emit the desired dose or energy of radiation 110.

FIG. 2 illustrates a three-dimensional view of a prior art detector element 200 that is commonly comprised within a detector array (e.g., 108 in FIG. 1), such as a flat panel, two-dimensional, direct conversion detector array, for example. As illustrated, the detector element 200 comprises a direct conversion detector material 202 and one or more pixels 204 (e.g., a pixelated array).

The direct conversion detector material 202 is configured to convert radiation (e.g., radiation photons) into electric charge. That is, when radiation impinges the direct conversion material 202 (e.g., emitted from a source (e.g., 106 in FIG. 1) situated above the direct conversion material 202), electron hole pairs are created, and steered towards the pixels (e.g., using an electrode placed above the direct conversion material 202 (not shown) configured to bias the material 202).

It will be appreciated to those skilled in the art that the direct conversion material 202 may be comprised of any appropriate material that provides radiation detection properties suitable for a direct conversion detector array (e.g., having the capability to absorb radiation and produce an electric charge in response thereto). For example, the direct conversion detector material 202 may comprise a crystalline material, such as Cadmium Zinc Telluride and/or Cadmium Telluride, and/or an amorphous material, such as doped amorphous Selenium and/or amorphous Silicon, for example.

Electric charge that collects at the bottom of the direct conversion material 202 is detected by a pixel(s) 204 situated spatially proximate to a location on the bottom of the direct conversion material wherein the electric charge is collected. The respective pixels 204 are generally organized as a thin-film transistor array, and thus the pixelated array may be said to be a TFT array. However, other electrical components that are suited to detect electric charge and generate a signal indicative of the detected electric charge are also contemplated herein. For example, in another embodiment, the thin-film transistor array is replaced with a complementary metal oxide semiconductor (CMOS) array.

Based upon which pixel detected the electric charge, a trajectory of the radiation (e.g., or individual rays of radiation) can be determined and used to reconstruct an image of the object under examination. Stated differently, in one embodiment, a pixel addressing scheme can be used for respective pixels, where an electric charge received by a pixel is assigned to a particular location within the object under examination.

FIG. 3 illustrates an example environment 300 for combining a plurality of prior art detector elements 302 (e.g., 200 in FIG. 2) together to form a detector array (e.g., 108 in FIG. 1). As illustrated, adjacent edges of the two detector elements 302 are angled 304 at 90 degrees relative to a bottom surface 310 of the elements 302 (as well as to other surfaces of the elements) (e.g., the corners are substantially square). When the elements are pushed together and attached to a substrate (not shown), such as glass, for example, a gap 306 remains between the detector elements 302. It can be appreciated that radiation can pass through the gap 306 between the two detector elements 302 substantially unimpeded, thus resulting in unwanted interference with electronics (not shown) situated below the detector elements 302.

The gap 306 generally has a thickness 308 which can be tens or hundreds of microns, up to several millimeters, and in some embodiments is filled with a filler material, such as lead or loaded oxides, for example, that is configured to absorb radiation that would normally traverse the gap 306 (e.g., inhibiting the radiation from interfering with electronics below the detector elements 302). While the filler material has proven effective for reducing the amount of radiation that interferes with electronics below the detector elements 302, the thickness 308 of the gap 306 is generally enlarged (e.g., relative to the thickness 308 if no filler material is used) to accommodate the filler material. Thus, when filler material is used, there may be an increase in pitch (e.g., defined as the distance between center points of two adjacent pixels). Such an increase is generally undesirable because less radiation is measured and image resolution is thereby reduced (e.g. the larger the pitch, the smaller the image resolution). That is, the larger the gap, the larger the percentage of emitted radiation that goes undetected because radiation that impinges the filler material is not used to reconstruct an image of the objet under examination. Moreover, the larger the gap the larger the pitch will be and thus the smaller the pixel geometric fill factor and the lower the spatial resolution.

Figure 4:
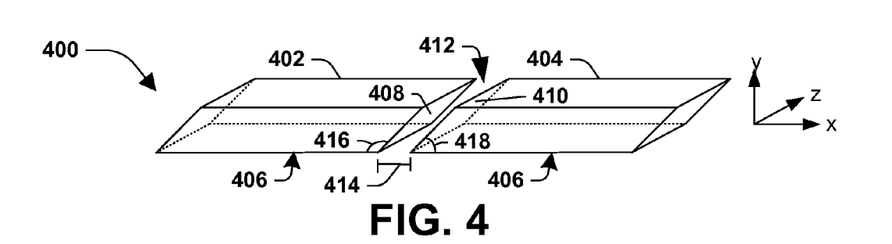
FIG. 4 illustrates a three-dimension view of two detector elements that may be comprised within a radiographic detector array, a first detector element having an angled portion configured to overlap an angled portion of a second detector element.

FIG. 4 illustrates an example environment 400 for arranging detector elements 402, 404 having overlapping portions to yield a detector array (e.g., 108 in FIG. 1) as described herein (e.g., to replace the prior art elements illustrated in FIGS. 2 and 3 having edges that are substantially square). More specifically, as illustrated in FIG. 4, a first detector element 402 and a second detector element 404 respectively comprise at least one edge 408, 410 that is angled 416, 418 (e.g., as measured from the interior of the respective detector elements 402, 404) at other than ninety degrees relative to a bottom surface 406 of the respective detector elements 402, 404. Generally, the angle 416 of an edge 408 of the first detector element 402 is substantially supplementary to an angle 418 of an adjacent edge 410 of the second detector element 404 (e.g., such that the combined angles 416, 418 of the adjacent edges 408, 410 is substantially equal 180 degrees). For example, the edge 408 of the first detector element 402 may be angled 416 at 105 degrees and the adjacent edge 410 of the second detector element 404 may be angled 418 at 75 degrees (e.g., making their combined total be 180 degrees). It will be appreciated that in one embodiment (e.g., in a preferred embodiment), one of the angled edges 408, 410 of the detector elements 402, 404 is angled at an angle between 70 degrees and 89 degrees while the other angled edge 410, 408 of the detector elements 404, 402 is angled at an angle between 91 degrees and 110 degrees relative to a bottom surface 406 of the respective detector elements 402, 404.

From a different perspective, the detector elements 402, 404 may be said to be cut and/or otherwise manufactured at angles other than 90 degrees, such as at angles of 75 degrees or more, but less than 90 degrees, for example. That is, for example, if a machine similar to a miter saw were to cut the direct conversion material (e.g., 202 in FIG. 2) and/or indirect conversion material(s), the machine may be set to cut 75 degree angles in the material. Thus, one side of the cut (e.g., one edge 410 of one detector element 404) would have an angle 418 of 75 degrees, and the other side of the cut (e.g. one edge 408 of another detector element 402) would have an angle 416 of 105 degrees. It will be appreciated that generally a cutting angle of 70 degrees or more is preferred, but angles of less than 70 degrees are also contemplated herein.

As illustrated, a gap 412 may be defined by the space between the first and second detector elements 402, 404. The gap 412 generally has a thickness 414 of 50 microns or less depending upon manufacturing tolerances that are applied during the manufacturing and/or polishing of the detector elements. For example, in one embodiment, a thickness 414 of 20 microns or less is preferable. However, it will be appreciated that the gap 412 may have a thickness 414 that exceeds 50 microns, and thus scope of the instant application is not intended to be so limited as to a detector array having detector elements 402, 404 separated by a gap 412 of 50 microns or less. That is, the thickness 414 of the gap 412 may exceed 50 microns in some embodiments.

In one embodiment, the example detector elements 402, 404 are direct conversion detector elements and may comprise components similar to those illustrated in FIG. 2. That is, the detector elements 402, 404 may comprise a direct conversion detector material (e.g., 202 in FIG. 2) and one or more pixels (e.g., 204 in FIG. 2). The direct conversion material may be comprised of material having properties suitable for converting radiation into electric charge. For example, the direct conversion material may be comprised of a crystalline material known to have such properties, such as Cadmium Zinc Telluride, Cadmium Telluride, and/or Silicon, for example, and/or an amorphous material, such as amorphous Selenium, for example. The pixels may be comprised of one or more electrical components configured to detect/measure the electric charge and generate signals in response thereto. For example, in one embodiment, the pixels are comprised of thin-film transistors (TFTs) and/or complementary metal oxide semiconductors (CMOS), for example. Generally, the pixels are arranged in a two-dimensional array, with the position of respective pixels being known (such that an addressing scheme can be developed for mapping detected radiation).

In yet another embodiment the detector elements 402, 404 are indirect conversion detector elements. In such an embodiment, the detector elements 402, 404 may comprise components similar to those found in indirect conversion detector elements known to those skilled in the art. For example, the detector elements 402, 404 may comprise a scintillator configured to convert radiation into light and a photodetector array (e.g., comprised of one or more photodiodes) configured to convert the light into electric charge, which, in one embodiment, may be part of a TFT array or other pixelated array configured to detect/measure the electric charge and generate signals in response to the detected change. It will be appreciated that while reference is made to an indirect conversion detector array configured to convert radiation into light, other suitable techniques for converting radiation into another medium before the creation of electric charge are also contemplated.

Thus, the detector elements 402, 404 may be direct or indirect conversion detector elements that are suited for a direct conversion detector array or an indirect conversion detector array respectively, such as a flat panel direct conversion detector array and/or a flat panel indirect conversion detector array, for example. In a preferred embodiment, the detector elements have a height (e.g., measured in the y-dimension) of approximately one millimeter and a detection surface (e.g., measured in the x- and z-dimensions) of approximately 40 millimeters by 40 millimeters, but it will be appreciated that the instant application is not intended to be so limited. That is, the detector elements may have a height and/or detection surface that varies from the preferred embodiment. For example, in one embodiment, detection surface of respective elements may be 40 millimeters by 20 millimeters, or any other suitable dimensions.

Moreover, it will be appreciated that while reference is made to the detector elements 402, 404 comprising a TFT array or other pixelated array, it will be appreciated that the configuration of the detector elements 402, 404 is not intended to be so limited. For example, in another embodiment, a direct conversion detector element is merely comprised of a direct conversion detector material (e.g., 202 in FIG. 2) and an indirect conversion detector element is merely comprised of a scintillator material and a photodetector array, for example. That is, a charge detecting component (e.g., a TFT array or other pixelated array) is not part of the detector elements. Rather the detector elements 402, 404 are attached to the pixelated array during manufacturing of the detector array. Stated differently, during the construction of the detector array, a substrate, such as glass, organic material, and/or ceramic material, for example, may be cut and/or manufactured to the dimensions of the detector array. A TFT array, or other charge detecting component, may then be applied to the substrate, and finally the detector elements may be placed above the TFT array to complete the detector array. Thus, the TFT array or other pixelated array, for example is not a component of the detector elements.

Figure 5:
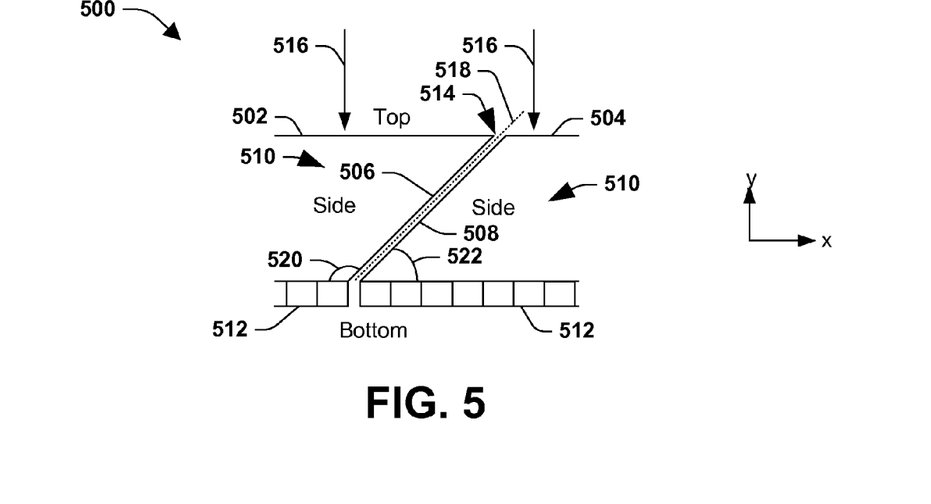
FIG. 5 illustrates a two-dimensional, zoomed in view of two detector elements, a first detector element having an angled portion configured to overlap an angled portion of a second detector element.

FIG. 5 illustrates a zoomed in cross-sectional view 500 of two detector elements 502, 504 (e.g., 402 and 404 in FIG. 4) having overlapping portions. More specifically, FIG. 5 illustrates two detector elements 502, 504 respectively having an angled edge 506, 508 (e.g., 408 and 410 in FIG. 4), the angled edge 506 of a first detector element 502 being adjacent an angled edge 508 of a second detector element 504. As illustrated, the detector elements 502, 504 are direct conversion detector elements, respectively comprising a direct conversion material 510 and a pixelated array (e.g., a TFT array) 512. Thus, there is no pixel situated below a gap 514 (e.g., defined by a space between the first detector element 502 and the second detector element 504) in the direct conversion detector material 510. However, in another embodiment, where the pixelated array 512 is not part of the detector elements 502, 504, and the detector elements 502, 504 are merely rested on top of a pixelated array (e.g., expanding across the two detector elements 502, 504), one or more pixels may be situated in the gap 514. Moreover, as described above, it will be appreciated that other configurations of the detector elements 502, 504 are contemplated herein. For example, the detector elements 502, 504 may be indirect conversion detector elements that may comprise or may not comprise a pixelated array.

As illustrated, primary radiation 516 that is emitted from a radiation source (e.g., 106 in FIG. 1) of a radiographic system (e.g., 102 in FIG. 1) generally travels through vertical planes that intersect the detector element 502, 504 at a ninety degree angle (e.g., plus or minus a few degree depending upon the position of the detector element relative to the radiation source). Thus, if the edges of the detector elements 502, 504 are angled 520, 522 at ninety degrees relative to a bottom surface of the respective detector elements (e.g., as illustrated in FIG. 3), radiation 516 could pass through the gap (e.g., 306 in FIG. 3) without being absorbed (e.g., assuming no filler material is applied to the gap). However, as illustrated in FIG. 5, due to the overlapping nature of the detector elements, at least a portion of the gap 514 is situated in a plane 518 that is not parallel to a plane through which primary radiation travels. Thus, primary radiation 516 cannot generally pass through the gap 514 without being at least partially absorbed by one or more of the detector elements 502, 504.

Figure 6:
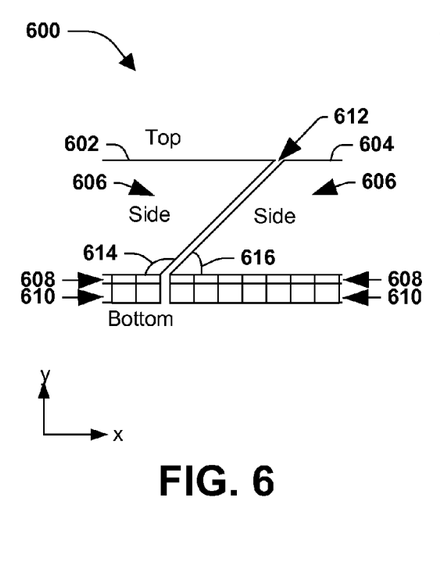
FIG. 6 illustrates a two-dimensional, zoomed in view of two indirect conversion detector elements, a first detector element having a portion that is configured to overlap a portion of a second detector element.

FIG. 6 illustrates a two-dimensional cross-sectional view of a portion of an indirect conversion detector array 600 (e.g., 108 in FIG. 1). More particularly, FIG. 6 illustrates a zoomed in view of two indirect conversion detector elements 602, 604, a first detector element 602 configured to overlap a portion of a second detector element 604.

As illustrated, the indirect conversion detector elements 602, 604 respectively comprise a scintillator material 606 configured to convert radiation energy into light, a photodetector array 608 configured to convert light into electric charge, and a pixelated array 610 (e.g., TFT array or CMOS array) configured to measure the electric charge and generate a signal in response thereto. In the illustrated example, the scintillator material 606 of respective indirect conversion detector elements 602, 604 is cut at angles 614, 616 other than 90 degrees relative to a bottom surface (e.g., not shown but akin to 406 in FIG. 4) of the respective detector elements 602, 604.

In one embodiment, a gap 612, defined by the space between adjacent edges of the first detector element 602 and the second detector element 604, may be filled with an optically transparent or partially transparent material that is configured to transport light generated by the scintillator 606 of the first detector element 602 to the scintillator 606 of the second detector element. In another embodiment, the light may be able to pass from scintillator to scintillator without the aid of an optically transparent or partially transparent material, and, thus, the gap 612 may be devoid of material, for example.

It will be appreciated that while reference is made to indirect conversion detector elements comprising a scintillator, a photodetector array, and a pixelated array, other configurations of indirect conversion detector elements known to those skilled in the art are also contemplated. For example, in one embodiment, the indirect conversion detector elements 602, 604 are merely comprised of a scintillator. Thus, the photodetector array and the pixelated array are not part of the indirect conversion detector element. Rather the indirect conversion detector element is placed onto a larger photodetector array and/or pixelated array configured to receive a plurality of detector elements, for example. In yet another embodiment, indirect conversion detector elements are comprised of a scintillator and photodetector, but not a pixelated array. In such an embodiment, the pixelated array may be configured to receive a plurality of indirect conversion detector elements, for example.

It will be appreciated that FIGS. 4-6 are merely intended to illustrate several example embodiments of detector elements having overlapping portions and are not intended to be an exhaustive list of the possible detector elements that can be devised. That is, the number of possible shapes that may be devised for detector elements comprising a portion that is configured to overlap a portion of an adjacent detector element is nearly limitless, and the aforementioned example configurations are merely provided as examples of some of the many possible configurations. For example, while the illustrated examples respectively illustrates two portions configured to overlap and/or be overlapped (e.g., a first detector element having a first angled edge and a second detector element having a second angled edge), the number of portions that overlap may be one or more. That is, in one embodiment, merely one edge of a detector element is angled and/or merely one portion of the detector element is configured to overlap another element or be overlapped by another element. In yet another embodiment (e.g., where detector elements have angled edges as illustrated in FIG. 4), a single detector element may have a plurality of angled edges (e.g., with opposing edges inclined at supplementary angles). For example, in one embodiment, a detector element comprises two angled edges, a first edge being angled at less than 90 degrees relative to a bottom surface (e.g., 406 in FIG. 4) of the detector element (e.g., as measured from the interior of the detector element (e.g., 522 in FIG. 5)) and a second edge being angled at an angle of more than 90 degrees relative to the bottom surface of the detector element (e.g., as measured from the interior of the detector element (e.g., 520 in FIG. 5)) such that the sum of the angle is 180 degrees, for example. For example, a first edge may be angled at 75 degrees and a second edge map be angled at 105 degrees. In yet another embodiment, the first detector element may comprise at least four angled edges, where at least two angled edges (e.g., a front and a side) are angled at less than ninety degrees relative to a bottom surface of the detector element (e.g., as measured from the interior of the detector element (e.g., 522 in FIG. 5)) and at least two edges (e.g., a back and a different side) being angled at more than ninety degrees relative to the bottom surface of the detector element (e.g., as measured from the interior of the detector element (e.g., 520 in FIG. 5)). Thus, the sum of the angles of opposing edges of a detector element may equal 180 degrees, for example.

It will also be appreciated that by using particularly shaped elements, a plurality of substantially identical detector elements can manufactured and compiled to form a detector array comprised entirely (or substantially entirely) of overlapping detector elements. For example, where respective detector elements form a square or rectangle comprising two edges (e.g., a front edge and a side edge) having an angle of less than ninety degrees and two edges (e.g., a back edge and a different side edge) having an angle of more than ninety degrees (e.g., as measured from an interior, angled wall of the detector element to a bottom wall of the detector element), a plurality of substantially identical detector elements can be manufactured and compiled to form a detector array with few to no gaps situated in a plane that is parallel to a plane through which radiation traverses.

It will be appreciated that in some direct conversion embodiments (e.g., depending upon the layout of the respective detector elements, the spacing of the gaps, and/or the orientation of the gaps, for example), electric charge that is generated in a portion of a detector element that overlaps another detector element may be hampered from being detected because of the gap separating the two adjoining detector elements. Stated differently, electric charge generally flows downward (e.g., towards an underlying pixel) because of a biasing electrode (not shown) that is placed above the direct conversion detector material. However, where an edge is angled and/or where an edge is at least partially situated in a plane that is not angled at ninety degree relative to a bottom surface of the detector element, electric charge generated in the overlapping detector element may be impeded from its downward flow by the gap between two detector elements.

It will be appreciated that a similar problem does not arise where the electric charge is generated by a portion of a detector element that is overlapped by another detector element because there is no gap between the place where the electric charge is generated and the underlying, collecting pixel.

Figure 7:
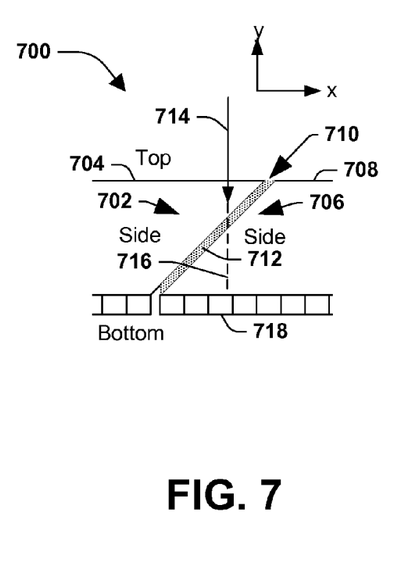
FIG. 7 illustrates a trajectory of electric charge generated in a portion of a first detector element that overlaps a portion of a second detector element.
Figure 8:
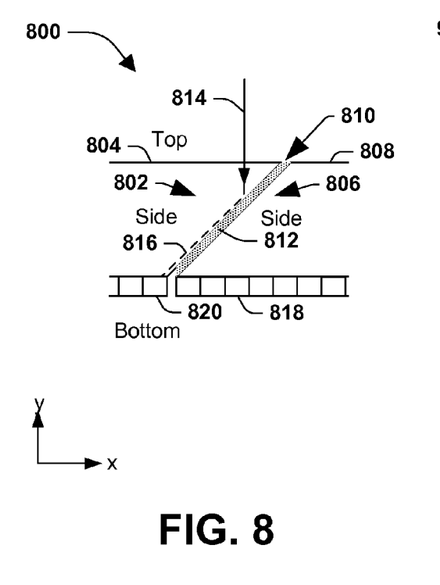
FIG. 8 illustrates a trajectory of electric charge generated in a portion of a first detector element that overlaps a portion of a second detector element.
Figure 9:
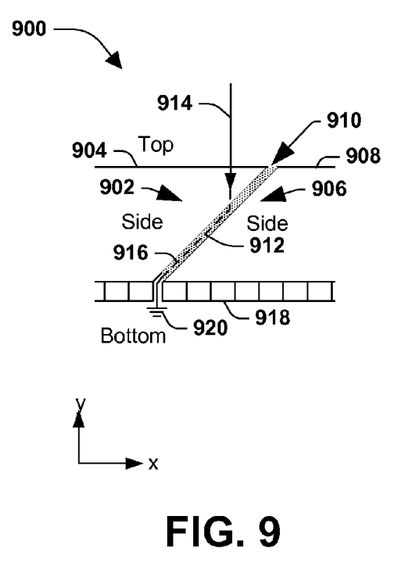
FIG. 9 illustrates a trajectory of electric charge generated in a portion of a first detector element that overlaps a portion of a second detector element.

FIGS. 7-9 illustrate example embodiments for controlling the electric charge that is generated in a charge producing portion of a detector element that overlaps another detector element, such that accumulation of electric charge adjacent an edge of the overlapping detector element is mitigated. It will be appreciated that while FIGS. 7-9 illustrate example embodiments for controlling electric charge when edges of the detector elements are angled at angles other than ninety degrees, the features described herein may be applied to other detector element configurations.

FIG. 7 illustrates a first example environment 700 for controlling electric charge that is generated in a portion 702 of a first detector element 704 that overlaps a portion 706 of a second detector element 708. A gap 710 is defined by an angled edge of the first detector element 704 and an overlapping angled edge of the second detector element 708. Within the gap 710 and/or on the angled edge of one or both of the detector elements 704, 708 is inserted an electrically conductive or semiconductive material and/or electrode 712 (e.g., represented by small dots within the gap 710) that may fill the gap and/or allow the transfer of electric charges between the first detector element 704 and the second detector element 708. For example, suppose radiation 714 where to impinge the first detector element 704 as illustrated in FIG. 7 and be converted into electric charge(s) in the first detector element. As illustrated by the trajectory of the electric charge(s) 716 (e.g., represented by the dotted line), the use of the electrically conductive material and/or electrode 712 may allow the electric charge(s) to travel from the first detector element 704 to the second detector element 708 and be detected by an underlying pixel 718.

FIG. 8 illustrates a second example environment 800 for controlling electric charge that is generated in a portion 802 of a first detector element 804 that overlaps a portion 806 of a second detector element 808. A gap 810 is defined by an angled edge of the first detector element 804 and a supplementary angled edge of the second detector element 808. Within the gap 810 and/or on the angled edge of one or both of the detector elements 804, 808 is inserted an electrode 812 (e.g., represented by small dots within the gap 810), or other electrical component that is configured to steer electric charges to a predetermined pixel location (e.g., that is not an underlying pixel if a straight path was followed). For example, suppose radiation 814 where to impinge the first detector element as illustrated in FIG. 8 and be converted into electric charge(s) in the first detector element 804. As illustrated by the trajectory of the electric charge(s) 816 (e.g., represented by the dotted line), the use of an electrode may allow the trajectory of the electric charge(s) to be changed such that, instead of being detected by an underlying pixel 818, it is instead steered to a different pixel 820.

It will be appreciated that as a result of the electric charge (s) being steered to a particular pixel (e.g., 820), the pixel to which the electric charge(s) was steered may detect/measure more electric charge than what was produced in a portion of the detector material that was not directly above the pixel. Moreover, pixel 818, for example may detect less electric charge than what was produced in the portion of the detector material directly above the pixel because a portion of the electric charge was steered by the electrodes 812, for example, to a different pixel. However, it will be appreciated to those skilled in the art that interpolation and/or other analytic/predictive techniques known to those skilled in the art can be used to correct for the excess charge detected by one pixel (e.g., 820) and the shortage of charge in another pixel (e.g., 818). For example, higher energy radiation may follow the same path as the lower energy radiation that was converted to electric charge(s) by the first detector element (e.g., illustrated with reference character 814), but be converted to electric charge by the second detector element 808, and thus be detected by pixel 818. Therefore, based upon the amount of radiation detected by 818 (e.g., and indicative of higher energy radiation), an approximated amount of electric charge that should have been detected by pixel 818 can be determined. Moreover, an amount of electric charge detected by pixel 820 that is attributable to radiation that should have yielded electric charge detected by pixel 818 can be subtracted from the amount detected by pixel 820, for example. Thus, using digital filtering and/or interpolation, for example, pixels 818 and 820, for example, can be corrected such that the measured amount of electric charge detected by respective pixels 818, 820 accurately reflects the amount of electric charge that should have been yielded by the pixels had the electric charge(s) been able to move downward to an underlying pixel, thus appropriately "(re)mapping" the charge.

FIG. 9 illustrates a third example environment 900 for controlling electric charge that is generated in a portion 902 of a first detector element 904 that overlaps a portion 906 of a second detector element 908. A gap 910 is defined by an angled edge of the first detector element 904 and a supplementary angled edge of the second detector element 908. Within the gap 910 and/or on the angled edge of one or both of the detector elements 904, 908 is inserted an electrode 912 (e.g., represented by small dots within the gap 910), or other electrical component that can be connected to a ground 920 to ground the electric charge. For example, suppose radiation 914 where to impinge the first detector element as illustrated in FIG. 9 and be converted into electric charge in the first detector element 904. As illustrated by the trajectory of the electric charge 916 (e.g., represented by the dotted line), electric charge that reaches an edge of the first detector element 904 would be received by the electrode 912 and grounded such that no pixel detects the electric charge, for example.

It will be appreciated that as a result of the grounding, a pixel 918 that should have detected the electric charge (e.g., had the electric charge been allowed to move freely), will detect less electric charge that it normally would have had an edge of a detector element not interfered. However, as described in more detail with respect to FIG. 8, based upon the amount of electric charge that is detected by the pixel 918 (e.g., yielded from higher energy radiation) and/or by neighboring pixels, an amount of electric charge that should have been detected by the pixel 918 can be approximated using interpolation techniques or other analytic/predictive techniques that can approximate a total amount of radiation that should be been detected by a pixel.

Figure 10:
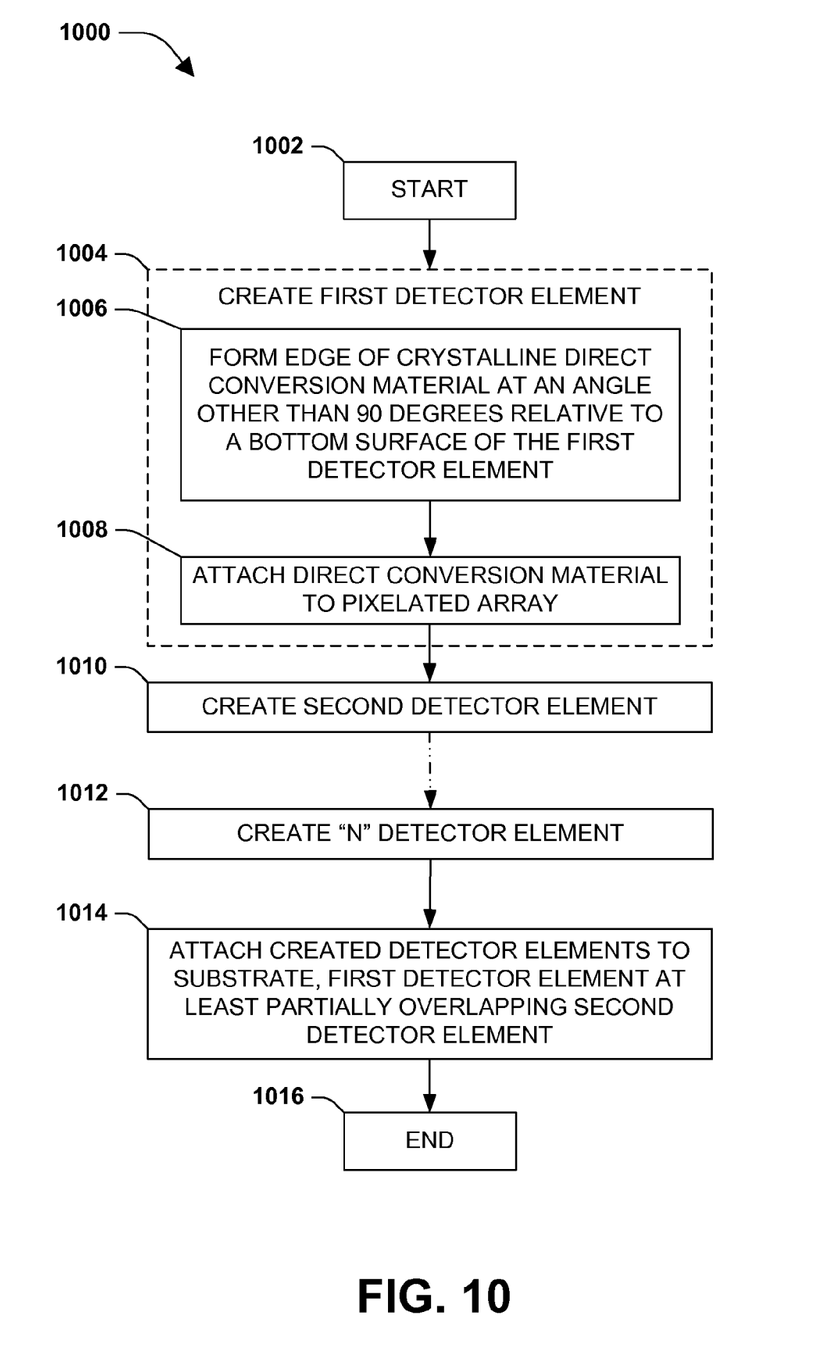
FIG. 10 is a flow diagram illustrating an example method of creating a radiographic detector array comprising first and second detector elements, a first detector element being configured to at least partially overlap a second detector element.

FIG. 10 illustrates an example method 1000 for creating a radiographic detector array. The example method 1000 begins at 1002, and a first detector element is created at 1004. The first detector element is configured to at least partially overlap a second detector element (e.g., as illustrated in FIGS. 4-9), and, as illustrated, involves forming (e.g., cutting) an edge of a crystalline direct conversion material at an angle other than 90 degrees relative to a bottom surface (e.g., 406 in FIG. 4) of the first detector element at 1006. Stated differently, in one embodiment, where the first detector element is a direct conversion detector element comprised of a crystalline direct conversion material such as Cadmium Zinc Telluride, Cadmium Telluride, and/or Silicon, the crystalline direct conversion material is cut at an angle (e.g., as illustrated in FIGS. 4-5), such that at least a portion of the angled edge is in a plane that is not parallel with a plane through which primary radiation traverses.

It will be appreciated that while reference is made to cutting a crystalline material as part of the creation procession, other and/or additional techniques for creating/manufacturing/forming a material comprising at least one edge that is angled at other than 90 degrees is also contemplated (that can be used alone and/or in combination with one another). For example, in one embodiment, creating the crystalline material further comprises polishing the material (e.g., to promote smooth, yet angled edges). It yet another embodiment, the material is not cut, but is rather grown or otherwise manufactured such that at least one edge of the material is angled at other than 90 degrees relative to a bottom surface of a first detector element (e.g. spatially approximate electronics (e.g., a TFT array)) of the detector array in which the material will reside.

It will also be appreciated that while reference is made in the illustrated example method 1000 to a direct conversion detector array comprising a direct conversion detector material, the instant application, including the scope of the claims, is not intended to be so limited. That is, to the extent possible, the method described herein may relate to other types of direct conversion detector arrays (e.g., comprising other types of direct conversion materials) and/or to indirect conversion detector arrays. For example, in another embodiment, creating the first detector element at 1004 comprises forming an edge of an amorphous direct conversion material, such as amorphous Selenium, for example, at an angle other than 90 degrees relative to a bottom surface of the first detector element. In yet another embodiment (e.g., where the detector element is an indirect conversion detector element), creating the first detector element may comprise cutting a scintillator material at an angle other than 90 degrees relative to a bottom surface of the first detector element (e.g., as illustrated in FIG. 6).

Creating the first detector element at 1004 further comprises attaching the direct conversion material to a pixelated array, such as a thin-film transistor array, a CMOS array, and/or another substrate with attached electronics, for example, at 1008 using an epoxy or other material having properties that are suited for adhering or otherwise attaching the direct conversion material to the pixelated array. Thus, the first detector element comprises a direct conversion material mounted on (e.g., attached to) a pixelated array.

It will be appreciated that in another embodiment, the pixelated array is not part of the detector element, and thus creating the first detector element at 1004 may merely comprise cutting an edge of a crystalline direct conversion material or otherwise forming the material at an angle other than 90 degrees relative to a bottom surface of the first detector element. For example, in one embodiment, the pixelated array is larger than individual elements of the detector array (e.g., and may be as large at the entire surface of the detector array), and a plurality of detector elements are adhered/attached to the pixelated array. Thus, the pixelated array is not part of the detector elements, but is rather merely a substrate upon which the detector elements are placed (e.g., to form the larger detector array).

It will also be appreciated that while reference is made in the example method 1000 to attaching the direct conversion material to the pixelated array of electronics, in other embodiments, such as when the first detector element is an indirect conversion detector element, the method may comprise additional acts not illustrated herein. For example, in a method for creating an indirect conversion detector element, once a scintillator material is formed (e.g., as described above), the scintillator material may be attached to a photodetector array (e.g., comprised of a plurality of photodiodes), and the photodetector array may be attached/adhered to a pixelated array, such as a TFT array or CMOS array, for example. Thus, creating an indirect conversion detector array may comprise, for example, cutting and/or polishing an edge of a scintillator material or other indirect conversion detector material at an angle other than 90 degrees relative to a bottom surface of the first detector element and stacking the scintillator material, the photodetector array, and the pixelated array. In yet another embodiment, creating an indirect conversion detector element comprises merely stacking the formed scintillator material and the photodetector array (e.g., the pixelated array is not part of the first detector element).

At 1010 in the example method, a second detector element is created. Generally, the second detector element is created in a manner similar to the first detector element. Thus, for example, where the first and second detector elements are direct conversion detector elements, creating the second detector element may comprise forming (e.g., cutting and/or polishing) an edge of a crystalline direct conversion material at an angle other than 90 degrees relative to a bottom surface of the first detector element and attaching the direct conversion material to the pixelated array. It will be appreciated that where other techniques are used to create the first detector element (e.g., as described above), similar techniques may be used to create the second detector element.

In the illustrated example method 1000, the act of creating detector elements having at least a pair of opposing edges that are angled at other than ninety degrees relative to a bottom surface of the detector element (e.g., as illustrated in FIGS. 4-5) may be repeated until, at 1012, an $N^{th}$ detector element is created, where N is a positive integer greater than or equal to two. In this way, a plurality of detector elements having one or more pairs of opposing edges angled at other than 90 degrees may be created (e.g., and ultimately the respective detector elements may be overlapped with one or more other detector elements to create a detector array that is larger than a single element).

At 1014 in the example method 1000 the created detector elements are attached (e.g., adhered) to a substrate, such as glass, organic material, and/or ceramic material, for example, using an epoxy, for example, to form the radiographic detector array. The first detector element at least partially overlaps the second detector element such that a gap (e.g., defined by the spacing between an adjacent edge of the first and second detector elements) at least partially resides in a plane that is not parallel to a plane through which primary radiation travels. Thus, substantially all of the primary radiation emitted from the radiation source comes into contact with a detector element (e.g., and cannot merely pass through a gap between two detector elements), for example.

It will be appreciated that while reference is made to merely a first detector element at least partially overlapping a second detector element, in one embodiment, respective (e.g., each of the) detector elements at least one of overlaps another detector element and is overlapped by another detector element. In this way, few, if any, gaps exists between detector elements through which primary radiation can traverse (e.g., and cause interference with electronics below the detector elements from the viewpoint of radiation source). That is, a substantially square detector element is overlapped on two sides (by two adjacent elements) while the two other sides of the (four sided) element overlap two other adjacent elements. In this manner, gaps in a resulting detector array comprised of a plurality of adjacent elements are not parallel to a direction of travel of primary radiation, but are instead angled at other than 90 degrees relative to a bottom surface of the array. It will be appreciated that such angled gaps would likewise be present in an array comprised of elements having other than four sides and/or in an array comprised of some elements with four or another number of sides and other elements having a different number of sides.

At 1016 the example method 1000 ends.

It will be appreciated that the words "example" and/or "exemplary" are used herein to mean serving as an example, instance, or illustration. Any aspect, design, etc. described herein as "example" and/or "exemplary" is not necessarily to be construed as advantageous over other aspects, designs, etc. Rather, use of these terms is intended to present concepts in a concrete fashion. As used in this application, the term "or" is intended to mean an inclusive "or" rather than an exclusive "or". That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims may generally be construed to mean "one or more" unless specified otherwise or clear from context to be directed to a singular form. Also, it will be appreciated that at least one of A and B and/or the like generally means A or B or both A and B.

Also, although the disclosure has been shown and described with respect to one or more implementations, equivalent alterations and modifications will occur to others skilled in the art based upon a reading and understanding of this specification and the annexed drawings. The disclosure includes all such modifications and alterations and is limited only by the scope of the following claims. In particular regard to the various functions performed by the above described components (e.g., elements, resources, etc.), the terms used to describe such components are intended to correspond, unless otherwise indicated, to any component which performs the specified function of the described component (e.g., that is functionally equivalent), even though not structurally equivalent to the disclosed structure which performs the function in the herein illustrated example implementations of the disclosure. Similarly, illustrated ordering(s) of acts is not meant to be limiting, such that different orderings comprising the same of different (e.g., numbers) of acts are intended to fall within the scope of the instant disclosure. In addition, while a particular feature of the disclosure may have been disclosed with respect to only one of several implementations, such feature may be combined with one or more other features of the other implementations as may be desired and advantageous for any given or particular application. Furthermore, to the extent that the terms "includes", "having", "has", "with", or variants thereof are used in either the detailed description or the claims, such terms are intended to be inclusive in a manner similar to the term "comprising."

What is claimed is:

1. A detector array for a radiation system comprising:
    a first detector element comprising:
        a first radiation conversion layer configured to convert radiation energy directly into electric charge, the first radiation conversion layer having at least one edge that is angled at other than 90 degrees relative to a bottom surface of the first radiation conversion layer to receive an edge of a second radiation conversion layer of an adjacent, second detector element; and
        two or more pixels underlying the first radiation conversion layer and configured to collect the electric charge.

2. The detector array of claim 1, wherein the first radiation conversion layer and the second radiation conversion layer are separated by a gap situated in a plane that is not parallel to a plane through which primary radiation that is emitted from a radiation source traverses.

3. The detector array of claim 2, wherein the gap has a thickness of about 20 microns or less.

4. The detector array of claim 2, wherein the gap is between about 5 microns and about 5 millimeters thick.

5. The detector array of claim 1, comprising one or more electrodes situated adjacent a first angled edge of the at least one edge.

6. The detector array of claim 5, wherein the one or more electrodes are configured to transfer the electric charge between the first radiation conversion layer and the second radiation conversion layer.

7. The detector array of claim 5, wherein the one or more electrodes are configured to transfer the electric charge to ground to mitigate a pooling of the electric charge along the first angled edge.

8. The detector array of claim 5, wherein the one or more electrodes are configured to steer the electric charge to a predetermined pixel location.

9. The detector array of claim 1, wherein the first radiation conversion layer comprises at least one of a crystalline material or an amorphous material.

10. The detector array of claim 1, wherein the first radiation conversion layer comprises at least one of Cadmium Zinc Telluride, Cadmium Telluride, Silicon, or amorphous Selenium.

11. The detector array of claim 1, wherein the detector array is a flat panel detector array comprising multiple two-dimensional detector elements including the first detector element and the second detector element.

12. The detector array of claim 1, wherein a first angled edge of the at least one edge is angled at less than 90 degrees relative to the bottom surface of the first radiation conversion layer and a second angled edge of the at least one edge is angled at more than 90 degrees relative to the bottom surface of the first radiation conversion layer.

13. The detector array of claim 1, wherein at least two angled edges of the at least one edge are angled at less than 90 degrees relative to the bottom surface of the first radiation conversion layer and at least two other angled edges of the at least one edge are angled at more than 90 degrees relative to the bottom surface of the first radiation conversion layer.

14. A method, comprising:
    creating a first detector element for a detector array configured to detect radiation by applying a first radiation conversion layer to a first set of two or more pixels, the first radiation conversion layer configured to convert radiation energy directly into electric charge and to overlap a second radiation conversion layer of an adjacent, second detector element.

15. The method of claim 14, comprising:
    attaching the first detector element onto a substrate of the detector array, the substrate configured to receive two or more detector elements; and
    attaching the second detector element onto the substrate of the detector array such that the first radiation conversion layer overlaps the second radiation conversion layer.

16. The method of claim 14, comprising at least one of:
    cutting an edge of a crystalline direct conversion material at an angle other than 90 degrees relative to a bottom surface of the crystalline direct conversion material to form the first radiation conversion layer; or
    polishing the edge of the crystalline direct conversion material at an angle other than 90 degrees relative to the bottom surface of the crystalline direct conversion material to form the first radiation conversion layer.

17. An examination apparatus configured to examine an object via radiation, comprising:
    a radiation source configured to emit radiation; and
    a two-dimensional detector array comprising a plurality of detector elements arranged in at least one of a linear or planar fashion, wherein a first detector element of the plurality of detector elements comprises:
        a first radiation conversion layer configured to convert radiation energy directly into electric charge, the first radiation conversion layer having at least one edge that is angled at other than 90 degrees relative to a bottom surface of the first radiation conversion layer to receive an edge of a second radiation conversion layer of an adjacent, second detector element; and
        two or more pixels underlying the first radiation conversion layer and configured to collect the electric charge.

18. The examination apparatus of claim 17, wherein the first radiation conversion layer and the second radiation conversion layer are separated by a gap situated in a plane that is not parallel to a plane through which primary radiation that is emitted from a radiation source traverses.

19. The examination apparatus of claim 17, comprising an electrode situated adjacent a first angled edge of the at least one edge and configured to steer the electric charge.

20. The method of claim 14, comprising applying an electrode between the first radiation conversion layer and the second radiation conversion layer.

* * * * *